US009185764B2

(12) United States Patent
Waser (10) Patent No.: US 9,185,764 B2
(45) Date of Patent: Nov. 10, 2015

(54) DRIVER ARRANGEMENT AND METHOD FOR DRIVING AT LEAST ONE LIGHT-EMITTING DIODE

(75) Inventor: Karl Georg Waser, Graz (AT)

(73) Assignee: ams AG, Unterpremstaetten (AT)

( * ) Notice: Subject to any disclaimer, the term of this patent is extended or adjusted under 35 U.S.C. 154(b) by 6 days.

(21) Appl. No.: 14/238,195

(22) PCT Filed: Aug. 14, 2012

(86) PCT No.: PCT/EP2012/065907
§ 371 (c)(1),
(2), (4) Date: May 29, 2014

(87) PCT Pub. No.: WO2013/024098
PCT Pub. Date: Feb. 21, 2013

(65) Prior Publication Data
US 2014/0252960 A1 Sep. 11, 2014

(30) Foreign Application Priority Data

Aug. 16, 2011 (DE) .................. 10 2011 110 720

(51) Int. Cl.
*H05B 37/02* (2006.01)
*H05B 33/08* (2006.01)

(52) U.S. Cl.
CPC ........ *H05B 33/0854* (2013.01); *H05B 33/0845* (2013.01); *H05B 33/0851* (2013.01); *G03B 2215/0567* (2013.01)

(58) Field of Classification Search
CPC .... H05B 37/02; H05B 33/08; H05B 33/0842; H05B 33/0845; H05B 33/0851; H05B 33/0854

USPC ............ 315/149, 151, 209 R, 224, 225, 291, 315/294, 302, 307, 308
See application file for complete search history.

(56) References Cited

U.S. PATENT DOCUMENTS

| 7,262,752 B2 | 8/2007 | Weindorf |
| 7,649,161 B2 | 1/2010 | Keh et al. |
| 7,990,074 B2 | 8/2011 | Sandner et al. |
| 2002/0025157 A1 | 2/2002 | Kawakami |

(Continued)

FOREIGN PATENT DOCUMENTS

| DE | 19917239 A1 | 10/2000 |
| DE | 10201053 A1 | 8/2002 |

(Continued)

OTHER PUBLICATIONS

Stich, A. et al., "LEDs for Flash Applications", Application Note, OSRAM Opto Semiconductors, Aug. 2010, pp. 1-14.

*Primary Examiner* — Jimmy Vu
(74) *Attorney, Agent, or Firm* — McDermott Will & Emery LLP (57) ABSTRACT

A driver arrangement comprises a current regulator (12), to which at least one light-emitting diode (15, 42) can be connected, and a driver circuit (13) that is coupled to the current regulator (12) and features a measurement input (20) for receiving a measurement signal (SM) that is dependent on the operation of the at least one light-emitting diode (15, 42). The driver circuit (13) is designed for adjusting the current level of the current regulator current (IS) of the current regulator (12) in dependence on the measurement signal (SM) such that a light quantity (SL) emitted by the at least one light emitting diode (15, 42) has a constant brightness value.

15 Claims, 6 Drawing Sheets

(56) References Cited

U.S. PATENT DOCUMENTS

| | | |
|---|---|---|
| 2005/0057554 A1 | 3/2005 | Yamamoto et al. |
| 2008/0037262 A1* | 2/2008 | Wesson ............... 362/362 |
| 2010/0194961 A1 | 8/2010 | Patel |
| 2010/0259191 A1 | 10/2010 | Ghanem et al. |
| 2011/0018465 A1 | 1/2011 | Ashdown |
| 2011/0043126 A1 | 2/2011 | McDermott |
| 2013/0241442 A1* | 9/2013 | Trattler ............... 315/307 |

FOREIGN PATENT DOCUMENTS

| | | |
|---|---|---|
| DE | 102006033233 A1 | 1/2008 |
| DE | 102008021871 A1 | 11/2008 |
| DE | 102007054253 B3 | 7/2009 |
| DE | 102008025865 A1 | 12/2009 |
| EP | 1044858 B1 | 10/2000 |
| WO | 2011/002280 A1 | 1/2011 |

\* cited by examiner

DRIVER ARRANGEMENT AND METHOD FOR DRIVING AT LEAST ONE LIGHT-EMITTING DIODE

TECHNICAL FIELD

The present invention pertains to a driver arrangement and a method for driving at least one light-emitting diode.

BACKGROUND

A light-emitting diode or LED makes available a light quantity such as, e.g., a luminous flux or an illuminance. The light quantity depends on the temperature of the light-emitting diode. In this case, the light quantity decreases as the temperature increases.

Document DE 19917239 A1 describes a method for determining correction factors in order to compensate the temperature drift of the radiant intensity of an LED. In this case, the temperature dependence of the conducting-state voltage of the LED is used for measuring a temperature of the LED.

Document US 2010/0194961 A1 concerns a camera that features a display, backlighting and an ambient light sensor.

SUMMARY

In one embodiment, a driver arrangement comprises a current regulator and a driver circuit. At least one light-emitting diode can be connected to the current regulator. The driver circuit is coupled to the current regulator. The driver circuit comprises a measurement input for receiving a measurement signal that is dependent on the operation of the at least one light-emitting diode. The driver circuit is furthermore designed for adjusting the current level of the current regulator current of the current regulator in such a way that a light quantity emitted by the at least one light-emitting diode has a constant brightness value.

At least one LED is advantageously operated by means of a current regulator. Due to the current/voltage characteristic of LEDs, an operation with the current regulator makes it possible to adjust the power consumed by an LED more precisely than an operation by means of a voltage source. The measurement signal advantageously depends on the operation of the at least one LED. Information on the at least one LED such as, for example, the efficiency can be advantageously determined from the measurement signal. The current level of the current regulator current advantageously makes it possible to precisely adjust the light quantity emitted by the LED.

In one embodiment, the light quantity emitted by the at least one LED is defined as the luminous flux or light flux that is generated by the at least one LED and measured in lm. Alternatively, the light quantity emitted by the at least one LED may be defined in the form of the light quantity measured in lms, the luminous emittance measured in $lmm^{-2}$, the luminous intensity measured in cd, the luminance measured in $cdm^{-2}$, the illuminance measured in lx, the lumination measured in $lmsm^{-2}$, the radiant energy measured in Ws, the radiant power measured in W, the radiant excitance measured in $Wm^{-2}$, the radiant intensity measured in $Wsr^{-1}$, the radiance measured in $W/(m^2sr)$, the irradiance measured in $Wm^{-2}$ or the irradiation measured in $Wsm^{-2}$.

In one embodiment, the constant brightness value of the light quantity is a predetermined brightness value.

In an alternative embodiment, the constant brightness value of the light quantity is the brightness value that is emitted by the at least one LED immediately after switching on the at least one LED. The brightness value of the light quantity therefore is advantageously adjusted to the initial brightness value for the duration of the illumination. However, a changing ambient temperature or aging effects may cause the initial values of the light quantity and therefore the constant brightness values to differ in two operating phases, between which the at least one LED is switched off.

In one embodiment, the driver circuit is designed in such a way that the at least one LED makes available a strobe light. The driver circuit is designed for driving the current regulator in such a way that the at least one LED delivers a strobe light with a constant brightness value. The brightness value is constant over the duration of the strobe light. The driver circuit is designed for adjusting the current level of the current regulator current in such a way that the at least one light-emitting diode emits the strobe light with the constant brightness value of the light quantity over the duration of the strobe light. In order to emit a strobe light, the LED can be operated with a high value of the current regulator current. A high value of the current regulator current leads to a high electrical power that is converted in the at least one LED and therefore to a temperature increase. However, the temperature increase would cause the brightness value to drop if the driver circuit would not counteract the decrease of the brightness value. The driver circuit compensates the decrease of the light quantity that would be emitted by the LED due to self-heating. The driver arrangement advantageously makes it possible for the light quantity to assume a constant value over the duration of the illumination, particularly during a flash. Consequently, sequentially scanned pixels of a camera are read out at an identical brightness value. The constant illumination over time improves the quality of the recorded picture.

In one embodiment, the measurement input is coupled to the at least one LED. The measurement signal corresponds to the voltage that drops across the at least one LED. If the at least one LED comprises two or more LEDs, the two or more LEDs are connected in series. The measurement signal may be a light-emitting diode voltage that drops across the series connection of LEDs. The light-emitting diode voltage that drops across the at least one LED depends on the respective temperature of the LED or LEDs. If the current value is known, the temperature of the at least one LED can be determined from the level of the voltage that drops across the at least one LED, i.e. from the measurement signal. In this case, the voltage dropping across an LED is proportional to the value of the absolute temperature of the LED or the LEDs. Consequently, the temperature of the LED can be determined with very little effort.

In one embodiment, the driver circuit is designed for determining the efficiency of the at least one LED from the measurement signal that represents the temperature of the at least one LED and for adjusting the current level of the current regulator current based on the efficiency of the at least one LED such that the light quantity has the constant brightness value.

In an alternative embodiment, the driver arrangement comprises a temperature sensor. The temperature sensor is coupled to the measurement input of the driver circuit. The temperature sensor delivers the measurement signal. The efficiency of the at least one LED can be advantageously determined with the measurement signal and the current level of the current regulator current can in turn be determined from the efficiency in order to achieve the constant brightness value of the light quantity. The temperature sensor may be arranged in spatial proximity to the at least one LED. The temperature sensor may consist of a silicone-spreading resistance sensor, a semiconductor diode sensor, a thin-film metal temperature sensor, an NTC-thermistor or a PTC-thermistor. The thermal coupling between the at least one LED and the temperature sensor is advantageously realized so well that the measurement signal corresponds to the temperature arising at the location of the at least one LED, and a delay between the temperature arising at the location of the at least one LED and the measurement signal is insignificant.

In one embodiment, the driver arrangement comprises a light sensor. The light sensor is coupled to the measurement input. The light sensor delivers the measurement signal. The light sensor may consist of an ambient light sensor or ALS. The light sensor may consist of a photodiode. The light sensor may be arranged in the light path of the at least one LED. The light sensor advantageously makes it possible to directly determine the brightness value of the light quantity. The current level of the current regulator current therefore can be very easily determined by means of the measurement signal. The calculation of the current level by means of the measurement signal therefore is not dependent on the efficiency of the at least one LED. Consequently, a driver circuit of this type can be inexpensively realized.

In one embodiment, the driver circuit comprises a light regulating circuit and a current regulator control. The input side of the light regulating circuit is coupled to the measurement input. The input side of the current regulator control is coupled to the light regulating circuit and its output side is coupled to the current regulator. The measurement signal is fed to the light regulating circuit. The light regulating circuit makes available a control signal in dependence on the measurement signal. The control signal may depend, for example, on the difference between the actual value of the light quantity and the constant brightness value. The current regulator control adjusts the current level of the current regulator in dependence on the control signal.

In an enhancement, the light regulating circuit is designed for determining a temperature signal in dependence on the measurement signal, for calculating a correction factor in dependence on the temperature signal and for calculating the light quantity in dependence on the correction factor and on the current regulator current. Consequently, the temperature-dependent light-emitting diode voltage or a measurement signal delivered by a temperature sensor makes it possible to determine the temperature of the light-emitting diode, as well as to determine the actual value of the light quantity from the temperature of the light-emitting diode by utilizing the information on the current level of the current regulator current. In this case, the light quantity increases as the current level of the current regulator current increases and as the temperature decreases.

In one embodiment, the light regulating circuit is designed for storing an initial value of the light quantity. The control signal delivered by the light regulating circuit therefore depends on the difference between the actual value of the light quantity and the initial value of the light quantity.

In an alternative embodiment, the constant brightness value is permanently set as default value in the light regulating circuit. In another alternative embodiment, the constant brightness value is fed to the light regulating circuit as default value. The light regulating circuit may be designed for making available the control signal in dependence on the difference between the actual value of the light quantity and the constant default value of the light quantity.

In an enhancement, the driver circuit comprises an analog-digital converter that couples the measurement input to the light regulating circuit. The analog-digital converter digitizes the measurement signal. The light regulating circuit is realized in the form of a digital circuit. The measurement signal advantageously can be acquired in a particularly precise fashion.

In one embodiment, the driver circuit comprises a voltage converter control. The driver circuit may furthermore comprise a logic circuit, the output side of which is coupled to the voltage converter control. The logic circuit may also be coupled to the current regulator control. The logic circuit may furthermore be coupled to the light regulating circuit.

In one embodiment, the driver circuit is designed for adjusting the current level of the current regulator current in such a way that the temperature of the at least one light-emitting diode maximally reaches a predetermined value. If the temperature of the at least one LED reaches the predetermined value, the current regulator current is also not increased if the actual value of the light quantity is lower than the constant brightness value. For safety reasons, the observation of a temperature limit for the at least one LED has priority over the constancy of the light quantity. The measurement signal made available by the temperature sensor or drops across the at least one LED in the form of a light-emitting diode voltage is utilized for the temperature measurement.

In one embodiment, the driver arrangement comprises a voltage converter. The output side of the voltage converter control is connected to the voltage converter. The voltage converter makes available a supply voltage. The current regulator and the at least one LED are supplied with the supply voltage. The supply voltage drops across a series circuit comprising the current regulator and the at least one LED.

In one embodiment, the current regulator is realized in the form of a current source. In this case, the current source is connected to the voltage converter and the at least one LED is connected to a reference potential terminal.

In an alternative embodiment, the current regulator is realized in the form of a current sink. In this case, the current sink is connected to the reference potential terminal and the at least one LED is connected to the voltage converter.

In one embodiment, a semiconductor body comprises the driver arrangement. The driver arrangement is realized on a first primary surface of the semiconductor body. The driver arrangement is arranged, in particular, on one semiconductor body.

In one embodiment, a lighting arrangement comprises the driver arrangement, as well as the at least one LED. The lighting arrangement may be integrated into a camera, a mobile radio communication device or a flashlight. The lighting arrangement may be utilized as a flash unit for the camera. The camera may be realized in the form of a camera for recording pictures or in the form of a video camera. Due to the lighting arrangement, the light quantity advantageously assumes the constant brightness value over the duration of the illumination, particularly during a flash. A predictable and high picture quality is advantageously achieved by means of the constant light quantity.

In one embodiment, a method for driving at least one LED comprises an emission of light by the at least one LED. A current regulator is connected to the at least one LED. A measurement signal that is dependent on the operation of the at least one LED is generated. A current level of the current regulator current of the current regulator is controlled in dependence on the measurement signal such that a light quantity emitted by the at least one LED has a constant brightness value.

The energy consumed by an LED advantageously can be precisely adjusted by means of a current regulator. The current level of the current regulator current is advantageously adjusted in dependence on the measurement signal and the constant brightness value of the light quantity.

The measurement signal may correspond to a measured temperature of the at least one LED. In this case, the measurement signal may correspond to the temperature of one of the several LEDs or to a value that is dependent on the different values of the respective temperatures of the several LEDs.

Alternatively, the measurement signal may correspond to a measured actual value of the light quantity.

In one embodiment, the at least one LED emits the light in the form of a flash. The light quantity is adjusted to the constant brightness value over the duration of the flash.

In one embodiment, a computer program product carries out the method for driving the at least one LED.

BRIEF DESCRIPTION OF THE DRAWINGS

Several embodiment examples of the invention are described in greater detail below with reference to the figures. Components or functional units with respectively identical function or operation are identified by the same reference symbols. The description of components or functional units with identical function is not repeated in each of the following figures. In these figures.

DETAILED DESCRIPTION

Figure 1A:
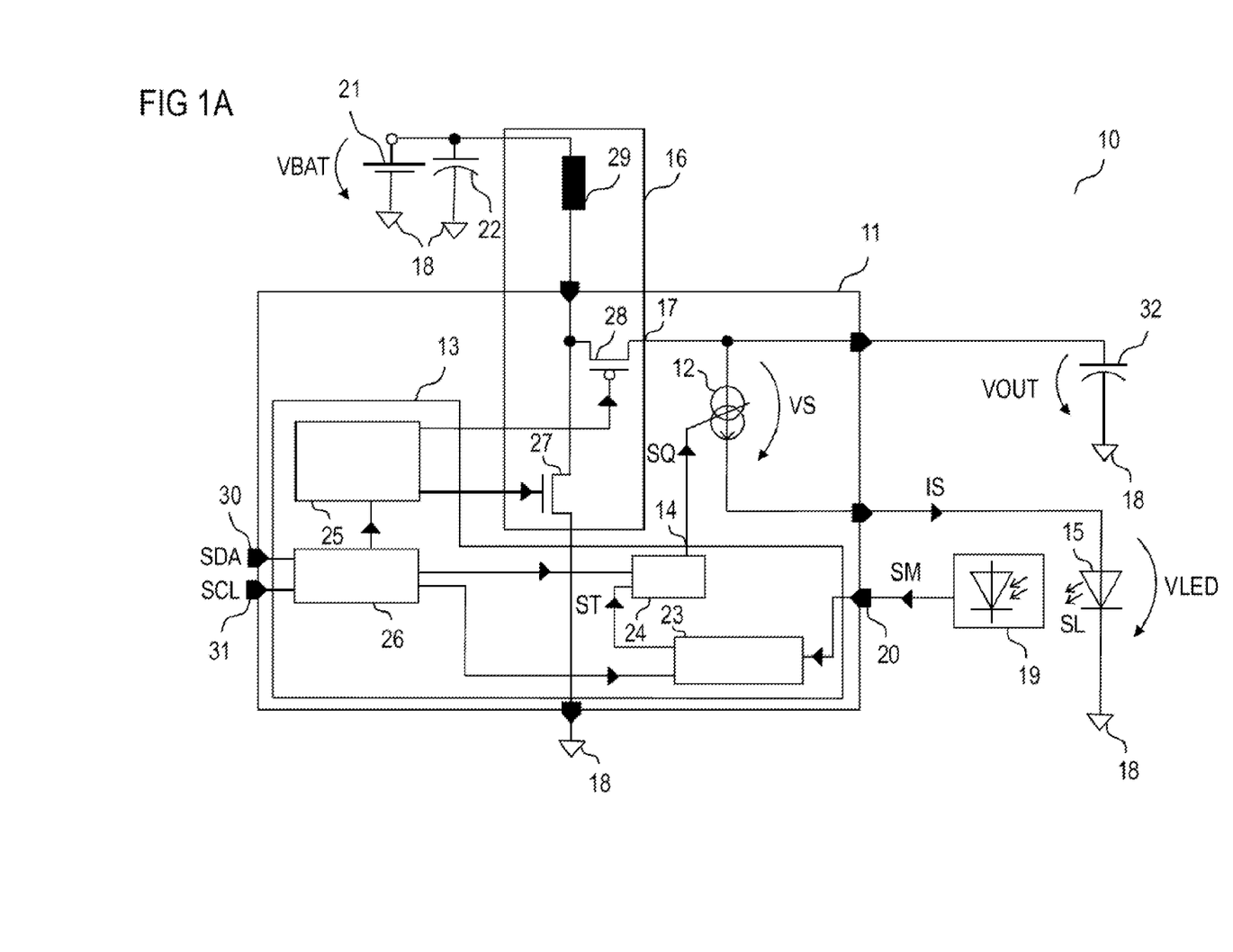
FIGS. 1A to 1C show embodiment examples of a lighting arrangement with the driver arrangement according to the proposed principle.

FIG. 1A shows an embodiment example of a lighting arrangement 10 according to the proposed principle. The lighting arrangement 10 comprises a driver arrangement 11. The driver arrangement 11 features a current regulator 12 and a driver circuit 13. The driver circuit 13 is coupled to a control input of the current regulator 12 at a driver output 14. The lighting arrangement 10 also features an LED 15 that is arranged in series with the current regulator 12. Furthermore, the driver arrangement 11 comprises a voltage converter 16. A series circuit comprising the current regulator 12 and the LED 15 is arranged between a voltage converter output 17 of the voltage converter 16 and a reference potential terminal 18. In this case, the current regulator 12 is connected to the voltage converter output 17 and the LED 15 is connected to the reference potential terminal 18. The current regulator 12 is implemented in the form of a current adjustment circuit. The current regulator 15 is realized in the form of a current source. The lighting arrangement 10 furthermore comprises a sensor 19 that is connected to a measurement input 20 of the driver circuit 13. A supply voltage source 21 is connected to an input of the voltage converter 16. The input of the voltage converter 16 is also connected to the reference potential terminal 18 via an input capacitor 22.

The driver circuit 13 features a light regulating circuit 23, the input side of which is connected to the measurement input 20. A current regulator control 24 of the driver circuit 13 is connected to the light regulating circuit 23 at an input. At an output, the current regulator control 24 is coupled to the control input of the current regulator 12 via the driver output 14. The driver circuit 13 also comprises a voltage converter control 25, the output side of which is connected to the voltage converter 16. The driver circuit 13 furthermore comprises a logic circuit 26, the output side of which is connected to the voltage converter control 25. The logic circuit 26 is also coupled to the current regulator control 24. The logic circuit 26 is furthermore connected to the light regulating circuit 23.

The voltage converter 16 is realized in the form of a boost converter. The voltage converter 16 features a first and a second switch 27, 28, as well as an inductor 29. The input of the voltage converter 16 is connected to the reference potential terminal 18 via the inductor 29 and the first switch 27. A junction between the inductor 29 and the first switch 27 is coupled to the voltage converter output 17 via the second switch 28. The first and the second switch 27, 28 are realized in the form of field effect transistors. In this case, the first switch 27 is implemented in the form of an n-channel field effect transistor and the second switch 28 is implemented in the form of a p-channel field effect transistor.

The driver circuit 13 furthermore comprises a first and a second terminal 30, 31. The first and the second terminal 30, 31 are connected to the logic circuit 26. The first and the second terminal 30, 31 are realized in the form of I2C terminals. The logic circuit 26 is implemented in the form of an I2C slave component. I2C is the abbreviation for Inter-Integrated Circuit. A filter capacitor 32 couples the voltage converter output 17 to the reference potential terminal 18.

The voltage source 21 delivers an input voltage VBAT that is fed to the input of the voltage converter 16. The voltage converter 16 transforms the input voltage VBAT into a supply voltage VOUT that can be tapped at the voltage converter output 17. The supply voltage VOUT therefore drops across the series circuit comprising the current regulator 12 and the LED 15. The sensor 19 generates a measurement signal SM that is fed to the measurement input 20. The light regulating circuit 23 generates a control signal ST in dependence on the measurement signal SM and said control signal is fed to the current regulator control 24. The current regulator control 24 makes available a current regulator signal SQ in dependence on the control signal ST and said current regulator signal is fed to the control input of the current regulator 12. The current regulator 12 delivers the current regulator current IS in dependence on the current regulator signal SQ. The current regulator current IS flows from the voltage converter output 17 to the reference potential terminal 18 via the current regulator 12 and the LED 15. A current regulator voltage VS drops across the current regulator 12. A light-emitting diode voltage VLED drops across the LED 15.

A first and a second terminal signal SDA, SCL realized in the form of I2C bus signals can be tapped at the first and the second terminal 30, 31. The first and the second terminal signal SDA, SCL are fed to the logic circuit 26. Information on the time and the duration of a strobe light is fed to the logic circuit 26 by means of the first and the second terminal signal SDA, SCL. The logic circuit 26 triggers the voltage converter control 25 in accordance with this information. Due to the triggering, the voltage converter 16 is transferred into an active operating state and therefore generates the supply voltage VOUT. For this purpose, an energy made available by the voltage source 21 is stored in the inductor 29 by closing the first switch 27. After opening the first switch 27 and closing the second switch 28, the energy stored in the inductor 29 is delivered at the voltage converter output 17 and stored in the filter capacitor 32.

After switching on the current regulator 12 by means of the current regulator signal SQ, the current regulator current IS is fed to the LED 15. The sensor 19 is realized in the form of a light sensor. The light emitted by the LED 15 is registered by means of the sensor 19. The sensor 19 may be arranged such that it is situated in the light path of the at least one LED 15. Alternatively, the sensor 19 is arranged in such a way that it detects the light reflected by the object that is illuminated by the LED 15. The measurement signal SM depends on a light quantity SL generated by the LED 15.

Switching on the current regulator current IS leads to an increase of the temperature in the LED 15. This causes the efficiency of the LED 15 to decrease. The decrease of the light quantity SL is detected by the sensor 19. The control signal ST is generated by the light regulating circuit 23 in accordance with the difference between an actual value of the light quantity SL that is represented by the measurement signal SM and a constant brightness value of the light quantity SL. The current regulator signal SQ is adjusted in accordance with the control signal ST such that the current level of the current regulator current IS is increased. This increase of the current regulator current IS compensates the increase of the temperature of the LED 15 and the reduction of the efficiency of the LED 15 caused by the temperature increase. If the actual value of the light quantity SL is lower than the constant brightness value, the current level of the current regulator current IS is increased. If the actual value of the light quantity SL is higher than the constant brightness value, the current level of the current regulator current IS is decreased.

A control loop therefore comprises the sensor 19, the light regulating circuit 23, the current regulator control 24, the current regulator 12 and the LED 15. The control loop is realized in an exclusively analog fashion. To this end, the light regulating circuit 23 and the current regulator control 24 exclusively feature analog components. The LED 15 advantageously emits the light quantity SL with the constant brightness value.

The light regulating circuit 23 and/or the current regulator control 24 may be alternatively realized in digital technology. For example, the light regulating circuit 23 may feature a processor. Software running on the processor generates the control signal ST from the measurement signal SM. An analog-digital converter may connect the measurement input 20 to the light regulating circuit 23.

The sensor 19 may be designed for determining the ambient light. An ambient light value of the light quantity SL is determined from the measurement signal SM determined by the sensor 19 prior to a flash of the LED 15. The ambient light value of the light quantity SL therefore corresponds to a brightness of the surroundings without a flash of the LED 15. The ambient light value of the light quantity SL is stored in a register. At least one strobe light parameter is adjusted in dependence on the ambient light value of the light quantity SL. Consequently, an application process, camera processor or baseband may advantageously carry out and optimize a calculation and an adjustment of the strobe light parameters with this information stored in the register. The strobe light parameters may consist of the constant brightness value of the light quantity SL, the duration of the strobe light, the aperture setting and the exposure time. The constant brightness value of the light quantity SL may also be referred to as exposure intensity and serves for adjusting the current level of the LED 15. The duration of the strobe light may also be referred to as flash duration. In addition to its main function, namely the determination of the actual light value during a strobe light in order to control a predetermined constant brightness value of the LED 15, the sensor 19 can also be used for determining the ambient light. Consequently, the strobe light parameters such as, for example, the exposure time or the aperture can be optimized and adapted to the ambient conditions. Under good to very good ambient light conditions, flashing then does not have to take place with the maximally adjustable current level. In addition, the lighting arrangement 10 can automatically decide whether flash assistance is required while a picture is recorded.

In an alternative embodiment that is not depicted, the current regulator 12 is connected to the reference potential terminal 18 and the LED 15 is connected to the voltage converter output 17. The current regulator 12 therefore is realized in the form of a current sink.

In an alternative embodiment that is not depicted, the sensor 19 is realized in the form of a temperature sensor. The temperature sensor delivers the measurement signal SM. The temperature sensor is arranged near the LED 15. The temperature sensor 19 measures the temperature of the LED 15. The measurement signal SM therefore corresponds to the temperature of the LED 15.

In an alternative embodiment that is not depicted, the voltage converter 16 is realized in the form of a buck converter or boost-buck converter.

Figure 1B:
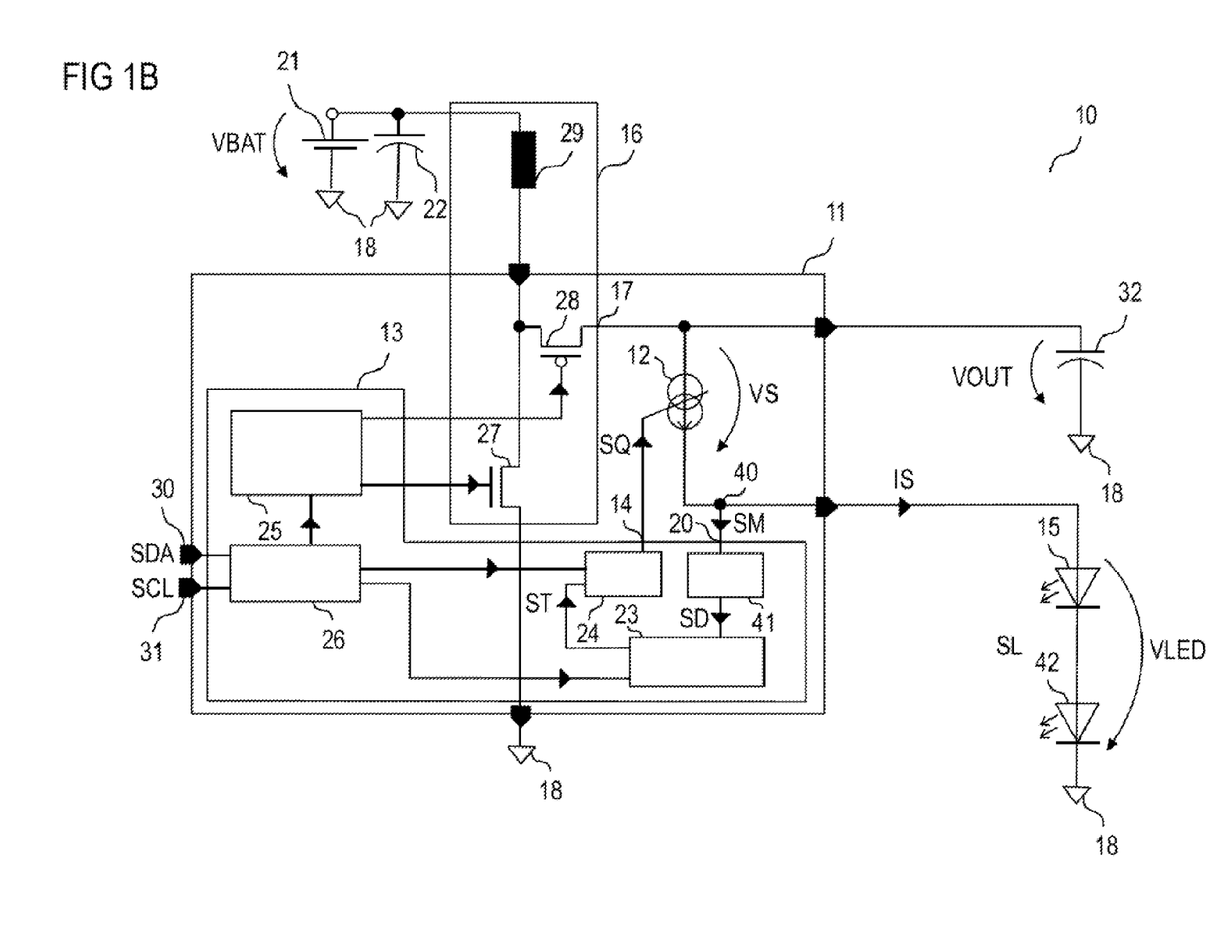

FIG. 1B shows another embodiment example of the lighting arrangement 10 according to the proposed principle that represents an enhancement of the lighting arrangement illustrated in FIG. 1A. The lighting arrangement 10 according to FIG. 1B does not comprise a sensor 19. A voltage tap junction 40 is arranged between the current regulator 12 and the light-emitting diode 15. The voltage tap junction 40 is connected to the measurement input 20. The measurement input 20 is therefore connected to a terminal of the LED 15. The driver circuit 13 comprises an analog-digital converter 41 that connects the measurement input 20 to the light regulating circuit 23. The lighting arrangement 10 furthermore comprises an additional LED 42 that is connected in series to the LED 15. The logic circuit 26 is implemented in the form of a state machine.

The current regulator current IS flows through the LED 15 and the additional LED 42. The light-emitting diode voltage VLED drops across a series circuit comprising the LED 15 and the additional LED 42. The light-emitting diode voltage VLED is fed to the measurement input 20 in the form of the measurement signal SM. The light-emitting diode voltage VLED is the sum of the forward voltages of the at least one LED 15, 42.

The analog-digital converter 41 digitizes the measurement signal SM and converts it into a digitized measurement signal SD. The digitized measurement signal SD is fed to the light regulating circuit 23. The light regulating circuit 23 respectively determines a temperature signal TS from the measurement signal SM and the digitized measurement signal SD. The temperature signal TS approximately corresponds to the temperature of the LED 15 and the temperature of the additional LED 42. Since the forward voltage of an LED not only depends on the temperature of the LED, but also on the current through the LED, the current regulator current IS can also be taken into consideration in a precise calculation of the temperature signal TS. The light regulating circuit 23 calculates a correction factor K from the temperature signal TS. The correction factor K reflects the influence of the temperature T of the at least one LED 15, 42 on the light quantity SL. The dependence of a relative luminous flux of an LED on the temperature T is illustrated as an example in FIG. 2A. The value of the relative luminous flux at a temperature T can be used as the value for the correction factor K at this temperature T, particularly if the luminous flux of the at least one LED 15, 42 is used as light quantity SL. The light quantity SL can be calculated by means of the correction factor K and the current regulator current IS. The control signal ST is determined by the light regulating circuit 23 from the difference of the thusly determined light quantity SL from the constant brightness value of the light quantity SL. The current regulator control 24 makes available the current regulator signal SQ in accordance with the control signal ST. The current regulator current IS is adjusted with the current regulator signal SQ.

The light regulating circuit 23 determines the measurement signal SM immediately after the current regulator 12 is switched on, i.e. it determines an initial value SM0 of the measurement signal SM. The light regulating circuit 23 determines an initial value TS0 of the temperature signal TS from the initial value SM0 of the measurement signal SM. The light regulating circuit 23 determines an initial value K0 of the correction factor K and an initial value SL0 of the light quantity SL based on the initial value TS0 of the temperature signal TS. The current level of the current regulator current IS, i.e. an initial value IS0 of the current regulator current IS, can be taken into consideration in the calculation of the initial value SL0 of the light quantity SL. The initial value SL0 of the light quantity SL results from the initial value K0 of the correction factor K multiplied by the initial value IS0 of the current regulator current IS. The current level of the current regulator current IS depends on the control signal ST. For example, a current level of the current regulator current IS is linearly dependent on the control signal ST. The initial value SL0 of the light quantity SL therefore can be calculated from the initial value K0 of the correction factor K and an initial value ST0 of the control signal ST.

Subsequently, the light regulating circuit 23 determines, from an actual value of the measurement signal SM, an actual value of the temperature signal TS, and from that an actual value of the correction factor K and an actual value of the light quantity SL. The current level of the current regulator current IS, i.e. an actual value of the current regulator current IS, can be taken into consideration in the calculation of the current value of the light quantity SL. The actual value of the light quantity SL results from the actual value of the correction factor K multiplied by the actual value of the current regulator current IS. Due to the functional correlation between the control signal ST and the current regulator current IS, the actual value of the light quantity SL can be determined from the actual value of the correction factor K and an actual value of the control signal ST.

The next value of the control signal ST is determined by the light regulating circuit 23 by means of a comparison of the actual value of the light quantity SL with the initial value SL0 of the light quantity SL. Over the duration of a flash, the light regulating circuit 23 continuously calculates the control signal ST from the actual value of the temperature signal TS. Consequently, the current level of the current regulator current IS is adjusted in such a way that the initial value of the light quantity SL is maintained at the beginning of the flash and the light quantity SL therefore has the constant brightness value. In this case, the initial value SL0 of the light quantity SL is the constant brightness value.

The control loop therefore comprises the analog-digital converter 41, the light regulating circuit 23, the current regulator control 24, the current regulator 12, as well as the at least one LED 15, 42.

In an alternative embodiment, a default value of the light quantity SL is stored in the light regulating circuit 23. Alternatively, the default value of the light quantity SL is fed to the light regulating circuit 23 by the logic circuit 26. The light regulating circuit 23 generates the control signal ST in accordance with the default value of the light quantity SL and the actual value of the light quantity SL. The default value of the light quantity SL therefore is the constant brightness value.

In an alternative embodiment that is not depicted, the driver circuit 13 features a digital-analog converter that connects the current regulator control 24 to the driver output 14 and therefore to the control input of the current regulator 12.

In an alternative embodiment that is not depicted, the lighting arrangement 10 comprises additional LEDs that are arranged in series to the LED 15 and to the additional LED 42.

Figure 1C:
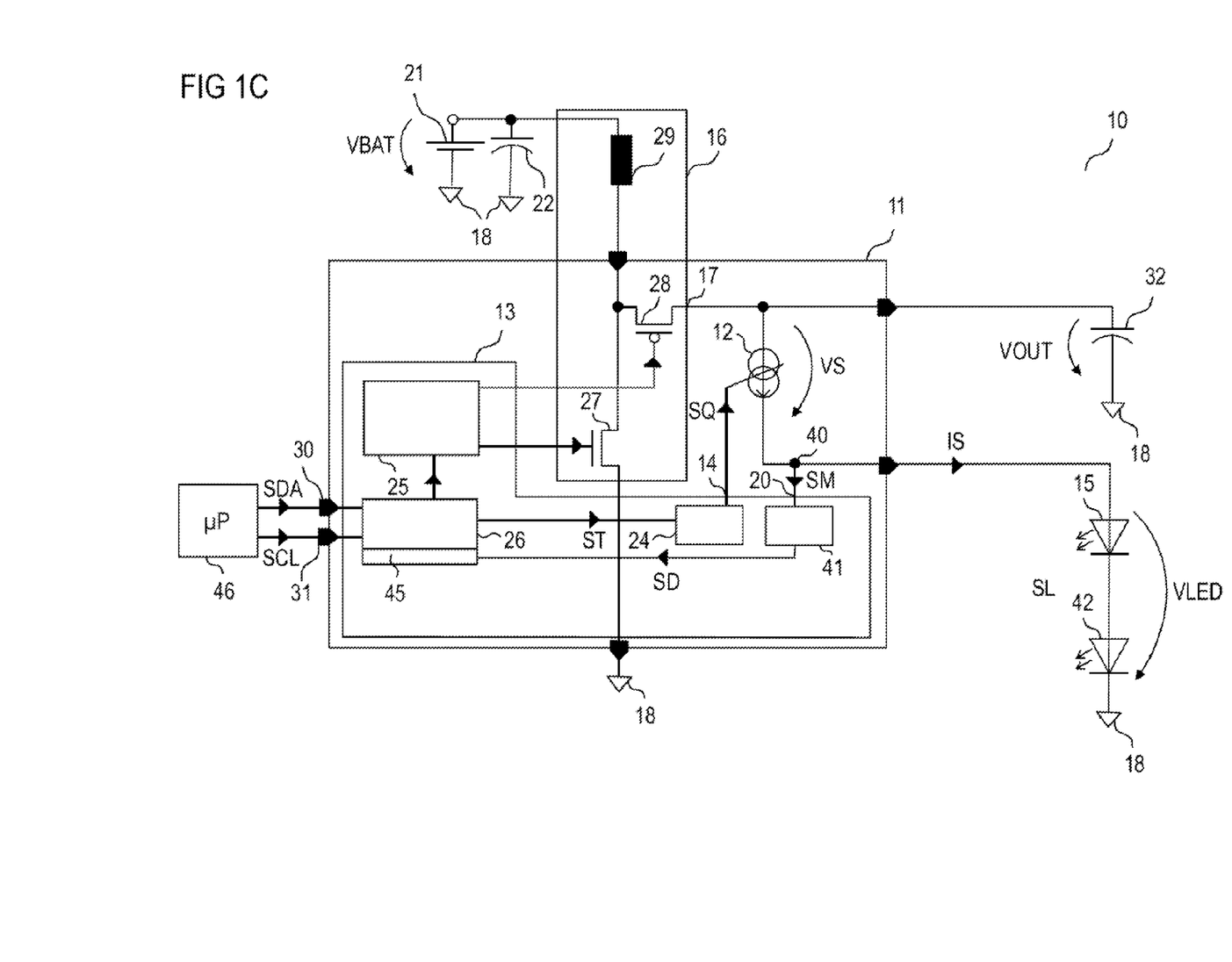

FIG. 1C shows another embodiment example of the lighting arrangement 10 according to the proposed principle that represents an enhancement of the lighting arrangement illustrated in FIGS. 1A and 1B. The logic circuit 26 additionally comprises a register 45. The measurement input 20 is coupled to the register 45 via the analog-digital converter 41. The register 45 stores the constant brightness value of the light quantity SL. The register 45 may serve, for example, for storing at least one of the aforementioned values, particularly for storing the initial value of the digitized measurement signal SD, the initial value ST0 of the control signal ST, the initial value SL0 of the light quantity SL, the actual value of the digitized measurement signal SD, the actual value of the control signal ST and the actual value of the light quantity SL. The correlation between the correction factor K and the temperature T illustrated in FIG. 2A may be stored in the register 45. The correlation is stored, for example, in the form of a point curve. Alternatively, the correlation is approximated with a straight line between two interpolation points and the values of the interpolation points are stored in the register 45.

The logic circuit 26 processes the information stored in the register 45. The logic circuit 46 drives the current regulator control 24. The light regulating circuit 23 therefore can be eliminated. Consequently, the logic circuit 26 also fulfills the function of the light regulating control 23. The logic circuit 26 evaluates the digitized measurement signal SD and makes available the control signal ST to the current regulator control 24. The logic circuit 26 may feature a microprocessor. The microprocessor may be realized in the form of an application processor. The program running in the control circuit 26 respectively generates the control signal ST from the measurement signal SM and the digitized measurement signal SD.

The lighting arrangement 10 furthermore comprises a processor 46. The processor 46 may be implemented in the form of a microprocessor or an application processor or APP processor. The processor 46 is coupled to the logic circuit 26 via the first and the second terminal 30, 31. The processor 46 makes available the first and the second terminal signal SDA, SCL. The processor 46 is realized in the form of an I2C master component. The processor 46 therefore communicates with the driver circuit 13 via an I2C bus. The processor 46 makes available the information on the flash time and the duration of the strobe light. The processor 46 may be used as a baseband processor or camera processor.

The control loop comprises the analog-digital converter 41, the logic circuit 26, the current regulator control 24, the current regulator 12, as well as the at least one LED 15, 43.

Figure 2A:
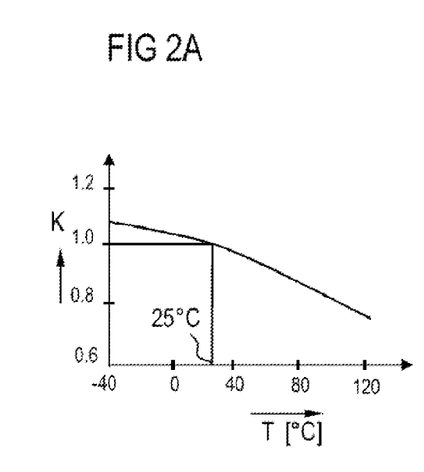
FIGS. 2A to 2C show embodiment examples of a characteristic of an LED and of signal curves of a lighting arrangement.

FIG. 2A shows an embodiment example of a characteristic of an LED. In FIG. 2A, the correction factor K is illustrated as a function of the temperature T of the LED 15. The current regulator current IS flowing through the LED 15 has a predetermined value. The correction factor K decreases as the temperature T increases. If the temperature of the LED 15 is known as described above, the decrease of the light quantity SL or the difference of the light quantity SL at a first and a second temperature value can be determined by means of the dependence of the correction factor K on the temperature T that can be determined for each LED or each LED type. The light quantity SL can be calculated in accordance with the following equation:

$$SL = \alpha \cdot K \cdot IS,$$

wherein K is the value of the correction factor, IS is the value of the current regulator current and $\alpha$ is a proportionality factor. If a first value SL1 of the light quantity SL at a first temperature T1 is equal to a second value SL2 of the light quantity SL at a second temperature T2, the following applies:

$$SL1 = \alpha \cdot K1 \cdot IS1,$$

$$SL2 = \alpha \cdot K2 \cdot IS2,$$

$$SL1 = SL2 \Rightarrow IS2 = \frac{K1 \cdot IS1}{K2},$$

wherein K1 is the value of the correction factor at the first temperature T1, IS1 is the value of the current regulator current at the first temperature T1, K2 is the value of the correction factor at the second temperature T2 and IS2 is the value of the current regulator current at the second temperature T2. If the temperature of the LED 15 increases from the first temperature T1 to the second temperature T2, the following applies in order to maintain the light quantity SL constant:

$$T1 < T2 \Rightarrow K1 > K2 \Rightarrow IS2 > IS1$$

Figure 2B:
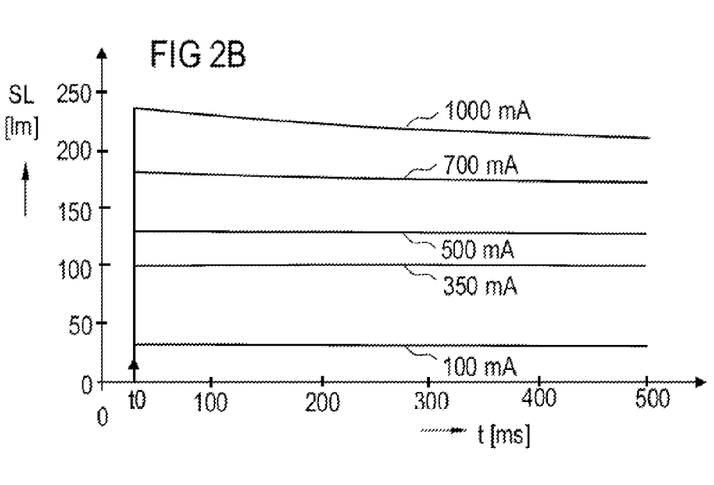

FIG. 2B shows an embodiment example of a signal curve during a pulse. In this case, the light quantity SL is illustrated as a function of the time t. The LED 15 is switched on at a start time t0=25 ms. The parameter for the different curves is the current regulator current IS flowing through the LED 15. FIG. 2B shows pulses for a current regulator current IS of 100 mA, 350 mA, 500 mA, 700 mA and 1000 mA. In this case, the current regulator current IS is maintained constant over the pulse duration. A control of the current level of the current regulator current IS as it is illustrated in the arrangements according to FIGS. 1A to 1C does not take place. At a current regulator current IS of 700 mA or 1000 mA, the decrease of the light quantity SL over the duration of the pulse is clearly detectable.

Figure 2C:
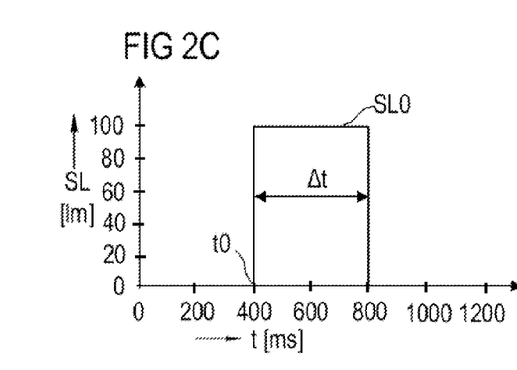

FIG. 2C shows an embodiment example of a signal curve during a pulse in a lighting arrangement 10 according to the proposed principle. The light quantity SL is illustrated in the form of a luminous flux. The pulse duration $\Delta t$ amounts to 400 ms. A typical integration time of a CMOS image sensor of a camera amounts to 300 ms. Consequently, the pulse duration $\Delta t$ is advantageously longer than the integration time of the CMOS image sensor. The luminous flux corresponds to a rectangular pulse. The light quantity SL has the constant brightness value 80 lm that represents the initial value SL0. Such an ideal shape of a pulse advantageously can be approximately achieved with a lighting arrangement 10 according to FIGS. 1A to 1C.

Figure 3:
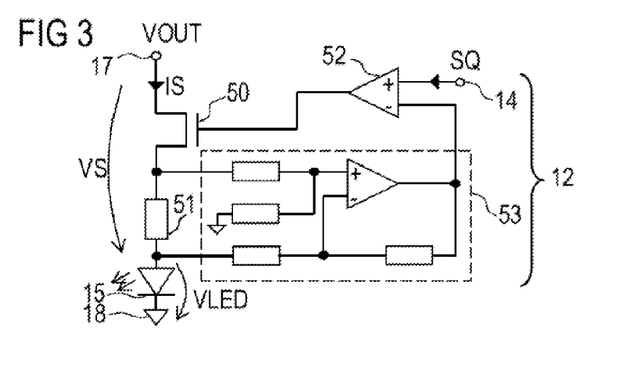
FIG. 3 shows an embodiment example of a current regulator of a driver arrangement.

FIG. 3 shows an embodiment example of the current regulator 12 suitable for use in the driver arrangement 11 according to FIGS. 1A to 1C. The current regulator 12 comprises a transistor 50 and a current sensor 51 that are connected in series to one another. The current sensor 51 is realized in the form of a resistor. The output side of the current sensor 51 is coupled to a first input of an amplifier 52 of the current regulator 12. A differential amplifier 53 of the current sensor 12 couples the two terminals of the resistor to the first input of the amplifier 52. A second input of the amplifier 52 is connected to the driver output 14. An output of the amplifier 52 is coupled to a control terminal of the transistor 50.

The current regulator signal SQ is fed to the second input of the amplifier 52. The amplifier 52 controls the transistor 50 in dependence on a comparison of the current regulator signal SQ with a signal made available by the current sensor 51 via the differential amplifier 53. The current regulator current IS flows through the transistor 50 and the current sensor 51. The current regulator current IS is proportional to the current regulator signal SQ. The current regulator 12 is advantageously realized in the form of a controlled current regulator. The current regulator current IS advantageously can be precisely adjusted by means of the current regulator signal SQ and therefore by means of the control signal ST.

Figure 4A:
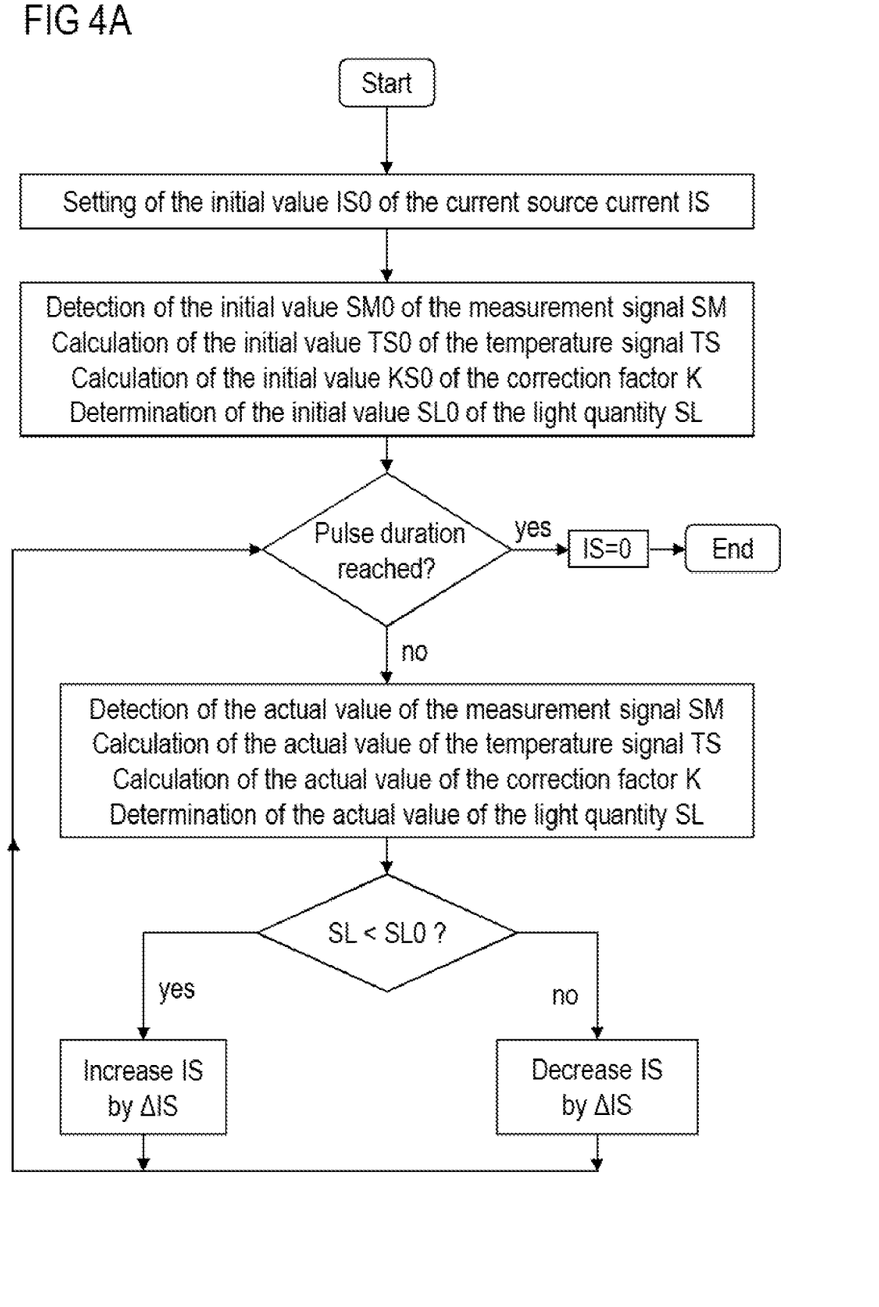
FIGS. 4A and 4B show embodiment examples of a method for driving at least one LED according to the proposed principle.

FIG. 4A shows an embodiment example of the method for driving at least one light-emitting diode 15, 42 according to the proposed principle. The method can be implemented in the lighting arrangement 10 according to FIG. 1B or 1C, as well as in the lighting arrangement according to FIG. 1A if the sensor 19 is realized in the form of a temperature sensor. The method may be realized in a computer program product. According to FIG. 4A, either the initial value SL0 of the light quantity SL or a parameter for the initial value SL0 of the light quantity SL is determined, and this value of the light quantity SL or of the parameter is subsequently maintained constant.

In this case, the initial value IS0 for the current regulator current IS is adjusted by means of the current regulator control 24 and the current regulator 12. Subsequently, the initial value SM0 of the measurement signal SM is acquired and the initial value TS0 of the temperature signal TS, the initial value K0 of the correction factor K and the initial value SL0 of the light quantity SL are determined from the initial value of the measurement signal. In this case, the initial value TS0 of the temperature signal TS is a function of the initial value SM0 of the measurement signal SM and of the initial value IS0 of the current regulator current IS. In addition, the initial value SL0 of the light quantity SL is a function of the initial value K0 of the correction factor K and of the initial value IS0 of the current regulator current IS. The initial value SL0 of the light quantity SL is proportional to the product of the initial value K0 of the correction factor K and the initial value IS0 of the current regulator current IS with a proportionality factor $\alpha$:

$$TS0 = f(SM0, IS0);$$

$$SL0 = f(K0, IS0) = \alpha \cdot K0 \cdot IS0$$

An actual value of the measurement signal SM is acquired in a loop and an actual value of the temperature signal TS is calculated from the actual value of the measurement signal. In this case, the actual value of the temperature signal TS is a function of the actual value of the measurement signal SM and of the actual value of the current regulator current IS. In addition, an actual value of the correction signal K and an actual value of the light quantity SL are determined from the actual value of the temperature signal TS. In this case, the actual value of the light quantity SL is a function of the actual value of the correction factor K and of the actual value of the current regulator current IS. The actual value of the light quantity SL is proportional to the product of the actual value of the correction factor K and the actual value of the current regulator current IS with the proportionality factor $\alpha$:

$$TS = f(SM, IS)$$

$$SL = f(K, IS) = \alpha \cdot K \cdot IS$$

A new actual value of the current regulator current IS is made available as a function of the initial value SL0 of the light quantity SL and of the actual value of the light quantity SL. If the actual value of the light quantity SL is lower than the initial value SL0 of the light quantity SL, the control signal ST and the current regulator signal SQ are adjusted in such a way that the actual value of the current regulator current IS is increased by an increment αIS. If the actual value of the light quantity SL is higher than the initial value SL0 of the light quantity SL, the control signal ST and the current regulator signal SQ are adjusted in such a way that the actual value of the current regulator current IS is decreased by an increment ΔIS. Cycling through the loop continues if the end of the pulse duration is not yet reached. However, if the end of the pulse duration is reached, the value of the current regulator current IS is adjusted to zero. This stops the flash emitted by the at least one LED 15.

The light quantity SL advantageously has a constant brightness value that is equal to the initial value SL0 of the light quantity SL. Consequently, the light quantity SL advantageously is only subject to slight changes over the pulse duration Δt. Due to the proportional correlation between the control signal ST and the current regulator current IS, the initial value and the actual value of the current regulator current SI can be determined from the initial value and the actual value of the control signal ST.

Figure 4B:
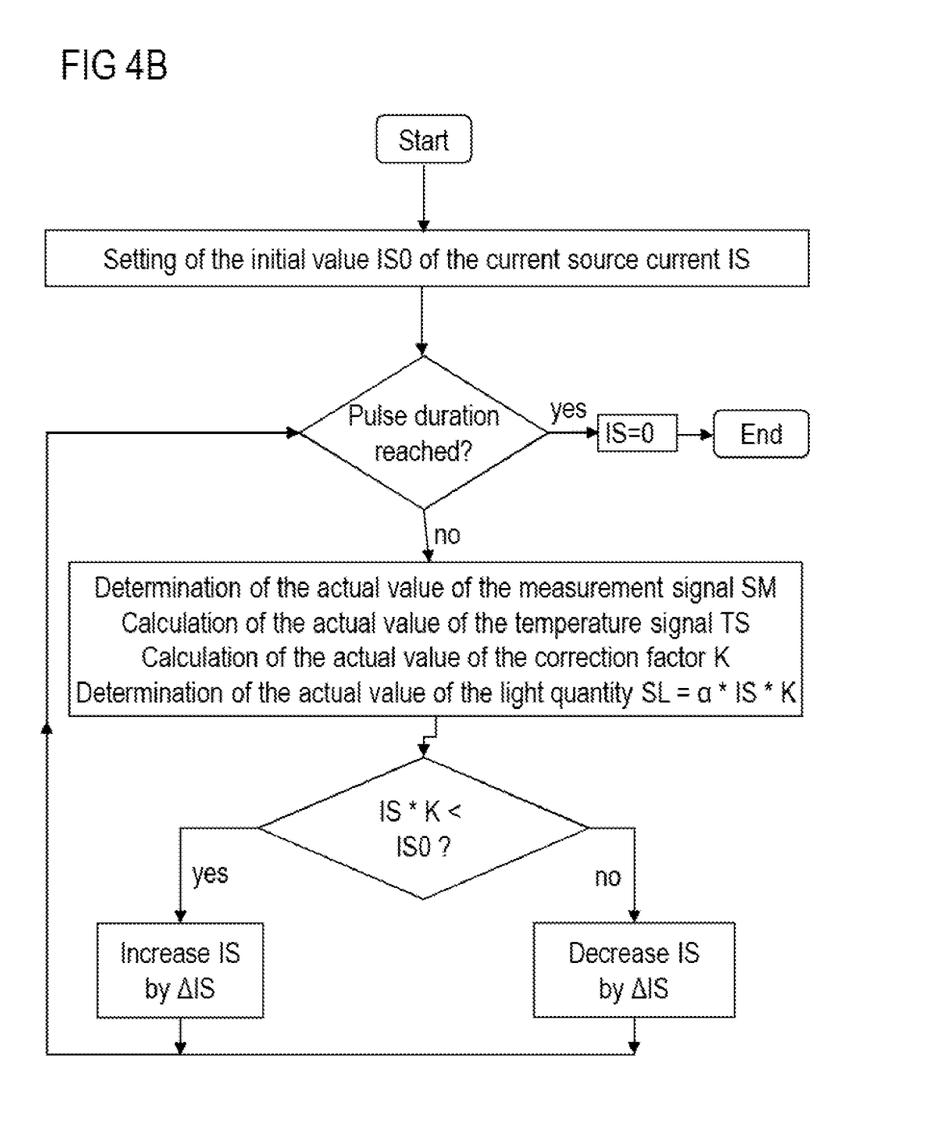

FIG. 4B shows another embodiment example of the method according to the proposed principle that represents an enhancement of the method illustrated in FIG. 4A. The method according to FIG. 4B can also be carried out in the lighting arrangement 10 according to FIGS. 1B and 1C, as well as in the lighting arrangement according to FIG. 1A if the sensor 19 is realized in the form of a temperature sensor. The initial value IS0 for the current regulator current IS is adjusted in such a way that a predetermined value for the light quantity SL is reached at the reference temperature. The correction factor K assumes the value 1 at the reference temperature. In the example illustrated in FIG. 2A, the reference temperature is 25° C.

The actual value of the measurement signal SM is acquired in a loop, wherein the actual value of the temperature signal TS is determined from the actual value of the measurement signal and the actual value of the correction factor K is furthermore determined from the actual value of the temperature signal TS. The actual value of the light quantity SL is determined from the actual value of the correction factor K. As in FIG. 4A, the actual value of the temperature signal TS is dependent on the actual value of the measurement signal SM and on the actual value of the current regulator current IS. Furthermore, the actual value of the light quantity SL is dependent on the actual value of the correction factor K and on the actual value of the current regulator current IS.

It is subsequently determined whether the actual value of the current regulator current IS needs to be changed. If the product of the actual value of the current regulator current IS and the actual value of the correction factor K is lower than the initial value IS0 of the current regulator current IS, the actual value of the current regulator current IS is increased by the increment ΔIS. However, if the product of the actual value of the current regulator current IS and the actual value of the correction factor K is higher than the initial value IS0 of the current regulator current IS, the actual value of the current regulator current IS is decreased by the increment ΔIS. Cycling through the loop is repeated if the duration of the pulse has not yet expired. However, if the duration of the pulse has been reached, the current regulator current IS is adjusted to the value 0. This causes the flash the stop.

The light quantity SL is advantageously adjusted to the predetermined brightness value. Fluctuations in the light quantity SL can initially occur because the reference temperature may deviate from the current temperature in the LED 15 prior to the triggering of the pulse. In order to keep the fluctuations small, a temperature that lies close to the expected temperature of the LED 15 can be chosen as reference temperature.

LIST OF REFERENCE SYMBOLS

10 Lighting arrangement
11 Driver arrangement
12 Current regulator
13 Driver circuit
14 Driver output
15 Light-emitting diode
16 Voltage converter
17 Voltage converter output
18 Reference potential terminal
19 Sensor
20 Measurement input
21 Voltage source
22 Input capacitor
23 Light regulating circuit
24 Current regulator control
25 Voltage converter control
26 Logic circuit
27 First switch
28 Second switch
29 Inductor
30 First terminal
31 Second terminal
32 Filter capacitor
40 Voltage tap junction
41 Analog-digital converter
42 Additional light-emitting diode
45 Register
46 Processor
50 Transistor
51 Current sensor
52 Amplifier
53 Differential amplifier
IS Current regulator current
IS0 Initial value of the current regulator current
K Correction factor
K0 Initial value of the correction factor
SCL Second terminal signal
SD Digitized measurement signal
SDA First terminal signal
SL Light quantity
SL0 Initial value of the light quantity
SM Measurement signal
SM0 Initial value of the measurement signal
SQ Current regulator signal
ST Control signal
ST0 Initial value of the control signal
T Temperature
t Time
t0 Start time
TS Temperature signal
TS0 Initial value of the temperature signal
VBAT Input voltage
VLED Light-emitting diode voltage
VOUT Supply voltage
VS Current regulator voltage
ΔIS Increment
Δt Pulse duration

The invention claimed is:

1. A driver arrangement, comprising:
   a current regulator, to which at least one light-emitting diode is connected, and
   a driver circuit that is coupled to the current regulator and comprises a measurement input for receiving a measurement signal that is dependent on the operation of the at least one light-emitting diode, wherein the driver circuit is designed for adjusting a current level of a current regulator current of the current regulator in dependence on the measurement signal such that a light quantity emitted by the at least one light-emitting diode has a constant brightness value,
   wherein the driver circuit is designed for adjusting the current level of the current regulator current in such a way that the at least one light-emitting diode emits a strobe light with the constant brightness value of the light quantity over the duration of the strobe light.

2. The driver arrangement according to claim 1,
   in which the measurement input is coupled to the at least one light-emitting diode and the measurement signal corresponds to the light-emitting diode voltage that drops across the at least one light-emitting diode.

3. The driver arrangement according to claim 1,
   in which the measurement input is coupled to a sensor that is realized in the form of a temperature sensor and the measurement signal corresponds to a temperature of the at least one light-emitting diode.

4. The driver arrangement according to claim 1,
   in which the measurement input is coupled to a sensor that is realized in the form of a light sensor and the measurement signal is dependent on the light quantity that is emitted by the at least one light-emitting diode.

5. The driver arrangement according to claim 4,
   in which the driver circuit is designed for determining an ambient light value of the light quantity from the measurement signal acquired prior to a flash of the at least one light-emitting diode and for adjusting at least one strobe light parameter in dependence on the ambient light value of the light quantity.

6. The driver arrangement according to one of claims 1 to 5,
   with the driver circuit comprising
   a light regulating circuit, the input side of which is coupled to the measurement input, and
   a current regulator control, the input side of which is coupled to the light regulating circuit and the output side of which is coupled to the current regulator.

7. The driver arrangement according to claim 6,
   in which the light regulating circuit is designed for determining a temperature signal from the measurement signal, for calculating a correction factor from the temperature signal and for calculating the light quantity by means of the correction factor and the current regulator current.

8. The driver arrangement according to claim 1,
   in which the driver circuit is designed for adjusting the current level of the current regulator current in such a way that a temperature of the at least one light-emitting diode maximally reaches a predetermined value.

9. The driver arrangement according to claim 1,
   with the current regulator comprising:
   a transistor and a current sensor that are connected in series to one another, as well as
   an amplifier, wherein the output side of the current sensor is coupled to a first input of the amplifier, a second input of the amplifier is connected to a driver output of the driver circuit and an output of the amplifier is coupled to a control terminal of the transistor.

10. A method for driving at least one light-emitting diode, comprising the steps of:
    emitting light by the at least one light-emitting diode, to which a current regulator is connected,
    generating a measurement signal that is dependent on the operation of the at least one light-emitting diode, and
    controlling a current level of a current regulator current of the current regulator in dependence on the measurement signal such that a light quantity emitted by the at least one light-emitting diode has a constant brightness value and the light quantity is adjusted to the constant brightness value over the duration of a flash emitted by the at least one light-emitting diode.

11. The method according to claim 10,
    in which the measurement signal corresponds to the light-emitting diode voltage that drops across the at least one light-emitting diode.

12. The method according to claim 10,
    in which a sensor that is realized in the form of a temperature sensor and arranged in proximity to the at least one light-emitting diode delivers the measurement signal.

13. The method according to one of claims 10 to 12,
    in which a temperature signal is determined from the measurement signal and the current level of the current regulator current is adjusted in dependence on the temperature signal such that the light quantity has the constant brightness value.

14. The method according to claim 10,
    in which a sensor realized in the form of a light sensor delivers the measurement signal, and the measurement signal is influenced by the light of the at least one light-emitting diode.

15. The method according to claim 10,
    in which the current level of the current regulator current is adjusted in such a way that a temperature of the at least one light-emitting diode maximally reaches a predetermined value.

* * * * *